United States Patent
Chen et al.

(10) Patent No.: US 7,132,879 B2
(45) Date of Patent: Nov. 7, 2006

(54) BOOST CIRCUIT WITH A VOLTAGE DETECTOR

(75) Inventors: Yin-Chang Chen, Hsin-Chu Hsien (TW); Yang-Chieh Lin, Tai-Nan (TW)

(73) Assignee: AMIC Technology Corporation, Hsin-Chu (TW)

( * ) Notice: Subject to any disclaimer, the term of this patent is extended or adjusted under 35 U.S.C. 154(b) by 27 days.

(21) Appl. No.: 10/711,916

(22) Filed: Oct. 13, 2004

(65) Prior Publication Data

US 2006/0038606 A1    Feb. 23, 2006

(30) Foreign Application Priority Data

Aug. 17, 2004  (TW)  .............................. 93124733 A

(51) Int. Cl.
*G05F 3/02* (2006.01)
(52) U.S. Cl. ...................................... 327/537; 327/390
(58) Field of Classification Search ............ 327/536–7, 327/390, 589; 363/60
See application file for complete search history.

(56) References Cited

U.S. PATENT DOCUMENTS

| | | | | |
|---|---|---|---|---|
| 5,909,141 A | * | 6/1999 | Tomishima | .................. 327/536 |
| 6,100,557 A | * | 8/2000 | Hung et al. | .................. 257/299 |
| 6,198,340 B1 | * | 3/2001 | Ting et al. | .................. 327/536 |
| 6,456,154 B1 | * | 9/2002 | Sugimura | .................... 327/537 |

* cited by examiner

*Primary Examiner*—Quan Tra
*Assistant Examiner*—Ryan Jager
(74) *Attorney, Agent, or Firm*—Winston Hsu

(57) ABSTRACT

A boost circuit capable of boosting a reference voltage into an output voltage. The boost circuit includes a main transistor electrically connected to the output voltage, an auxiliary transistor electrically connected to the output voltage, a pre-charge circuit electrically connected to the main transistor and the auxiliary transistor for pre-charging the main transistor and the auxiliary transistor, and a voltage detector electrically connected to the auxiliary transistor and the reference voltage for controlling the auxiliary transistor according to the reference voltage.

12 Claims, 6 Drawing Sheets

US 7,132,879 B2

BOOST CIRCUIT WITH A VOLTAGE DETECTOR

BACKGROUND OF INVENTION

1. Field of the Invention

The present invention relates to a boost circuit, and more particularly, to a boost circuit with a voltage detector.

2. Description of the Prior Art

Please refer to FIG. 1, which is a circuit diagram of a boost circuit 10 according to the prior art. The boost circuit 10 comprises a first PMOS transistor 12, a second PMOS transistor 16, a main transistor 14, and a level shift circuit 18. The boost circuit 10 is capable of boosting a three-volt reference voltage Vdd into a five-volt output voltage $V_{out}$, which is needed for word lines applied in a fresh memory.

Of the boost circuit 10, the main transistor 14 is implemented to serve as a capacitor, the first PMOS transistor 12, along with the second PMOS transistor 16, which is controlled by the level shift circuit 18, is implemented to pre-charge the main transistor 14, and the level shift circuit 18 is implemented to selectively output an output voltage $V_{out}$ to the second PMOS transistor 16 according to a switch voltage $V_{sw}$. For example, if the switch voltage $V_{sw}$ is a logic high voltage, as shown in FIG. 2, the level shift circuit 18 outputs the output voltage $V_{out}$ to the second PMOS transistor 16 (a control voltage $V_c$ output from the level shift circuit 18 is the output voltage $V_{out}$) to turn off the second PMOS transistor 16. On the contrary, if the switch voltage $V_{sw}$ is a logic low voltage, the level shift circuit 18 outputs a zero-volt voltage, instead of the output voltage $V_{out}$, to the second PMOS transistor 16 (the control voltage $V_c$ output from the level shift circuit 18 is the zero-volt voltage) to turn on the second PMOS transistor 16.

The operation of the boost circuit 10 is described as follows in brief: When the switch voltage $V_{sw}$, which controls the level shift circuit 18, is equal to the logic low voltage and a kick voltage $V_{kick}$, which is implemented to control the main transistor 14, is equal to the zero-volt voltage, as shown in FIG. 2, the second PMOS transistor 16 is turned on and the boost circuit 10 is operating on a pre-charge state; When the switch voltage $V_{sw}$ is equal to the logic high voltage and the kick voltage $V_{kick}$ is equal to a reference voltage Vdd, the second PMOS transistor 16 is turned off and the boost circuit 10 is operating on a boost state. In order to insure that charges previously flowed into the main transistor 14 (serving as a capacitor) during the pre-charge state will not flow through the second PMOS transistor 16 to a region outside of the main transistor 14 when the boost circuit 10 is operating on the boost state, the switch voltage $V_{sw}$ is designed to have a rising edge slightly ahead of that of the kick voltage $V_{kick}$, so as to turn off the second PMOS transistor 16 before the boost circuit 10 is switched to operate from the per-charge state to the boost state.

Since a PMOS transistor has low carrier mobility, in order to improve the charging efficiency to charging the main transistor 14, the first PMOS transistor 12, and the second PMOS transistor 16 as well, usually has to occupy a large area. However, the bulky PMOS transistor 12 not only increases the cost of the boost circuit 16, a body effect coming along with the bulky PMOS transistor 12 also increases a threshold voltage and accordingly decreases the operation efficiency of the boost circuit 10.

Moreover, during a process that the boost circuit 10 outputs the output voltage $V_{out}$, if the reference voltage Vdd is higher than a predetermined voltage, the boost circuit 10 is likely to output too high a output voltage $V_{out}$, which has a big chance to make a severe impact on or even completely damages a circuit supplied by the output voltage $V_{out}$.

SUMMARY OF INVENTION

It is therefore a primary objective of the claimed invention to provide a boost circuit with a voltage detector, so as to overcome the drawbacks of the prior art.

According to the claimed invention, the boost circuit is capable of boosting a reference voltage into an output voltage, and the boost circuit includes a main transistor electrically connected to the output voltage, an auxiliary transistor electrically connected to the output voltage, a pre-charge circuit electrically connected to the main transistor and the auxiliary transistor for pre-charging the main transistor and the auxiliary transistor, and a voltage detector electrically connected to the auxiliary transistor and the reference voltage for controlling the auxiliary transistor according to the reference voltage.

According to the preferred embodiment, the pre-charge circuit includes a first PMOS transistor, a second PMOS transistor, and a level shift circuit electrically connected to the second PMOS transistor and the output voltage for transferring the output voltage to the second PMOS transistor according to a switch voltage.

According to a second embodiment, the boost circuit further includes a re-charge module electrically connected to the main transistor for re-charging the main transistor. The re-charge module includes a stable transistor, a main re-charge transistor for re-charging the main transistor according to a voltage level of the stable transistor, and a stable re-charge transistor for re-charging the stable transistor according to a voltage level of the main transistor.

The voltage detector of the boost circuit disables the auxiliary transistor when detecting that the reference voltage is higher than a predetermined voltage, so that the boost circuit will not output too high an output voltage, and the output voltage output from the boost circuit will not damage a circuit supplied by the output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
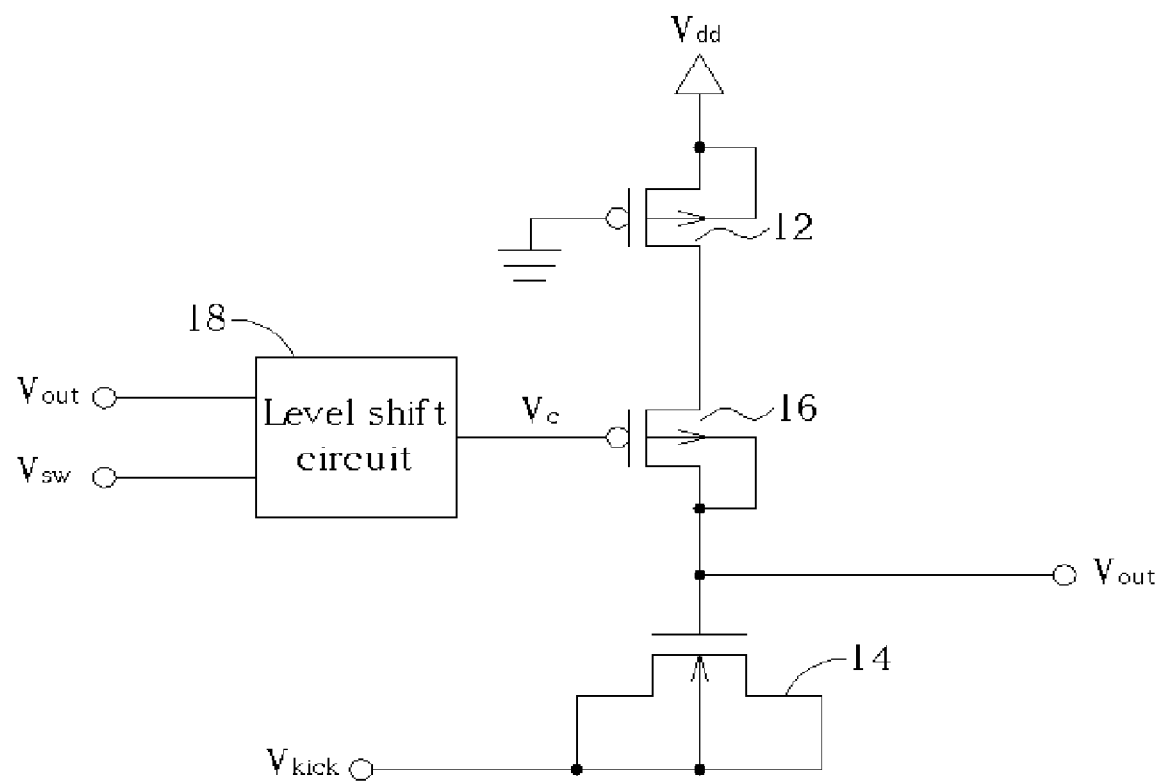
FIG. 1 is a circuit diagram of a boost circuit according to the prior art.
Figure 2:
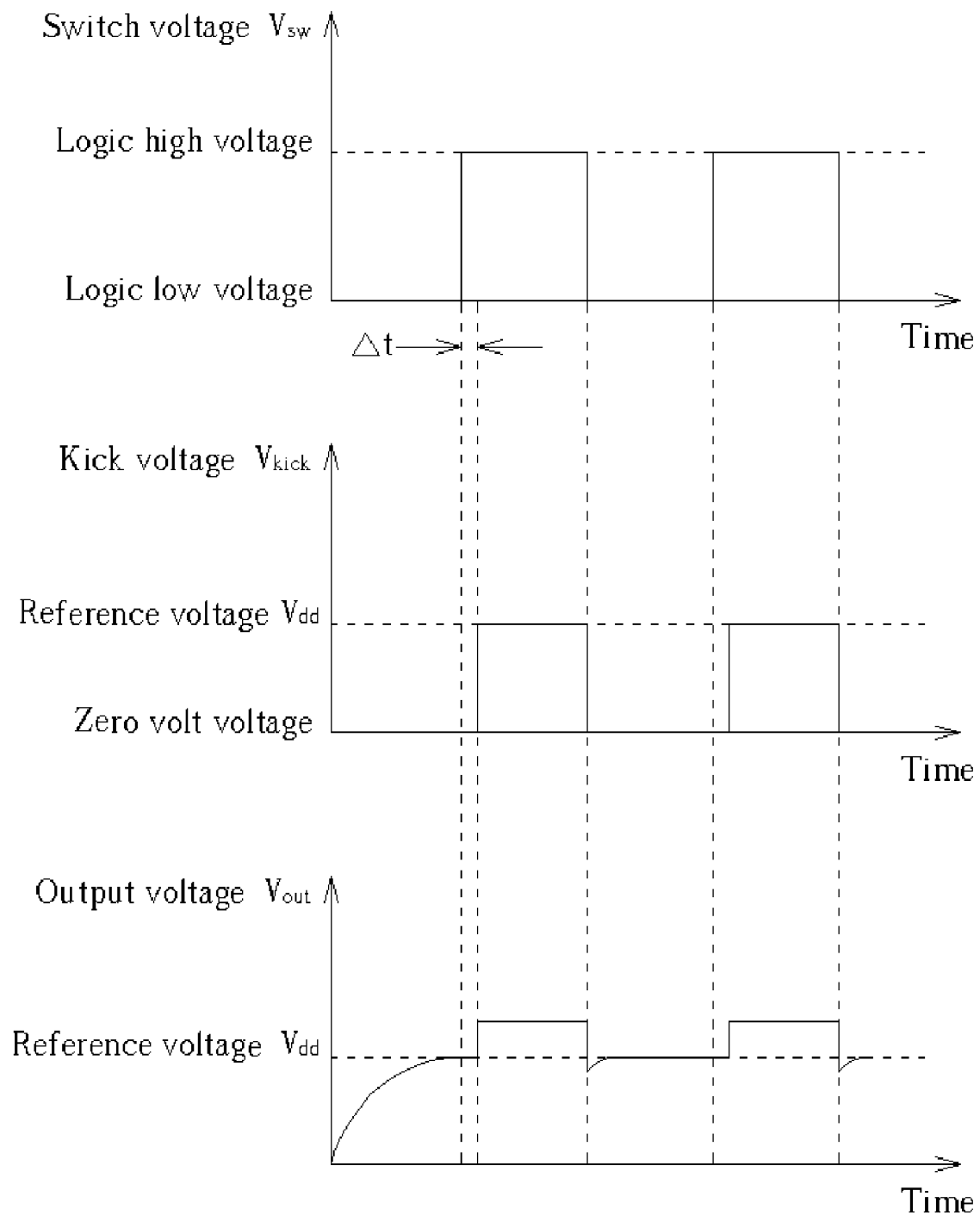
FIG. 2 is a waveform diagram showing a switch voltage $V_{sw}$, a kick voltage $V_{kick}$, and an output voltage $V_{out}$ in the boost circuit shown in FIG. 1 according to the prior art.
Figure 3:
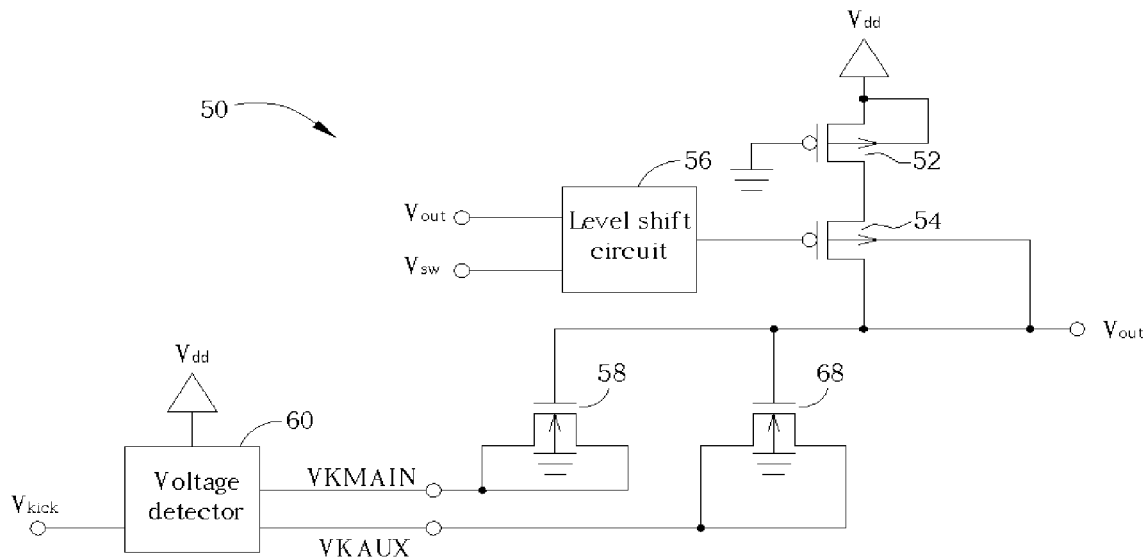
FIG. 3 is a circuit diagram of a boost circuit of the preferred embodiment according to the present invention.

Please refer to FIG. 3, which is a circuit diagram of a boost circuit 50 of the preferred embodiment according to the present invention. The boost circuit 50 comprises a first PMOS transistor 52, a second PMOS transistor 54, a level shift circuit 56 electrically connected to the second PMOS transistor 54, a main transistor 58, an auxiliary transistor 68, and a voltage detector 60 electrically connected to the main transistor 58 and the auxiliary transistor 68. The main transistor 58, and the auxiliary transistor 68 as well, can be a triple-welled NMOS, whose tripled well is grounded.

The voltage detector 60 in implemented to detect if the reference voltage Vdd is higher than the predetermined voltage, and to output a main kick voltage VKMAIN and an auxiliary kick voltage VKAUX to control the main transistor 58 and the auxiliary transistor 68 respectively. In detail, when detecting that the reference voltage Vdd is still lower than the predetermined voltage, the voltage detector 60 outputs the main kick voltage VKMAIN and the auxiliary kick voltage VKAUX, both of which are equal to the kick voltage $V_{kick}$; On the contrary, when detecting that the reference voltage Vdd is higher than the predetermined voltage, the voltage detector 60 outputs the main kick voltage VKMAIN, which is still equal to the kick voltage $V_{kick}$, and the auxiliary kick voltage VKAUX, which is equal to the zero volt voltage; In summary, as long as the reference voltage Vdd is higher than the predetermined voltage, the auxiliary kick voltage VKAUX output from the voltage detector 60 is equal to the zero volt voltage, which disables the auxiliary transistor 68, no matter what value the kick voltage $V_{kick}$ has.

The operation of the boost circuit 50 is described as follows: (1) When the switch voltage $V_{sw}$ to control the level shift circuit is equal to the logic low voltage, and the kick voltage $V_{kick}$ is equal to the zero volt voltage (at this moment, the main kick voltage VKMAIN, and the auxiliary kick voltage VKAUX as well, is equal to the zero volt voltage, whether the reference voltage Vdd is higher than the predetermined voltage or not), the second PMOS transistor 54 is turned on and the boost circuit 50 is operating on the pre-charge state; (2a) On the contrary, when the switch voltage $V_{sw}$ is equal to the logic high voltage, the kick voltage $V_{kick}$ is equal to the reference voltage Vdd, and the reference voltage Vdd is still lower than the predetermined voltage, the second PMOS transistor 54 is turned off and the boost circuit 50 is operating on a full-boost state, when the main transistor 58 and the auxiliary transistor 68 are both enabled; (2b) When the switch voltage $V_{sw}$ is equal to the logic high voltage, the kick voltage $V_{kick}$ is equal to the reference voltage Vdd, and the reference voltage Vdd is higher than the predetermined voltage, the second PMOS transistor 54 is still turned off, but the boost circuit 50 is switched to operate on a half-boost state, when the main transistor 58 is enabled, while the auxiliary transistor 68, which is controlled by the auxiliary kick voltage VKAUX, which is equal to zero volt voltage, is disabled.

Of the boost circuit 50 shown in FIG. 3, the main transistor 58 is to connect with the kick voltage $V_{kick}$ indirectly via the voltage detector 60. However, of a boost circuit of the present invention, the main transistor 58 can be implemented to connect to the kick voltage $V_{kick}$ directly. In such a scenario, the main transistor 58 is always enabled, whether the reference voltage Vdd is higher than the predetermined voltage or not.

Figure 4:
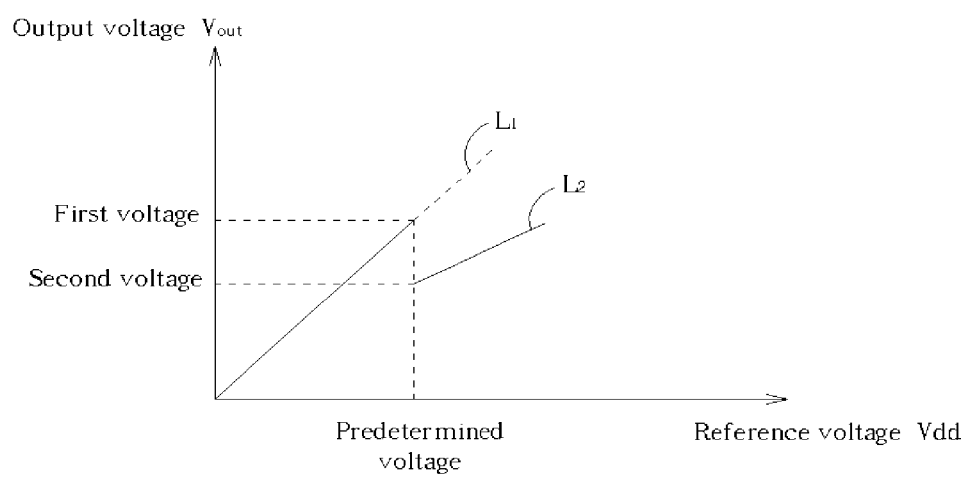
FIG. 4 is a waveform diagram showing a reference voltage Vdd and an output voltage $V_{out}$ in the boost circuit shown in FIG. 3 according to the present invention.

Please refer to FIG. 4, which is a waveform diagram showing the reference voltage Vdd and an output voltage $V_{out}$ in the boost circuit 50 according to the present invention. When the reference voltage Vdd is still lower than the predetermined voltage, the output voltage $V_{out}$ is increased gradually along a first curve $L_1$. As soon as the voltage detector 60 detects that the reference voltage Vdd is higher than the predetermined voltage, the output voltage $V_{out}$ is abruptly decreased and has a value decreased from a first voltage to a second voltage, which is smaller than the first voltage, and is increased gradually along a second curve $L_2$, whose slope is smaller than that of the first curve $L_1$. Therefore, the boost circuit 50 will not output too high the output voltage $V_{out}$, even though the reference voltage Vdd is higher than the predetermined voltage, and the output voltage $V_{out}$ output by the boost circuit 50 will not make any damage on a circuit supplied by the output voltage $V_{out}$.

Figure 5:
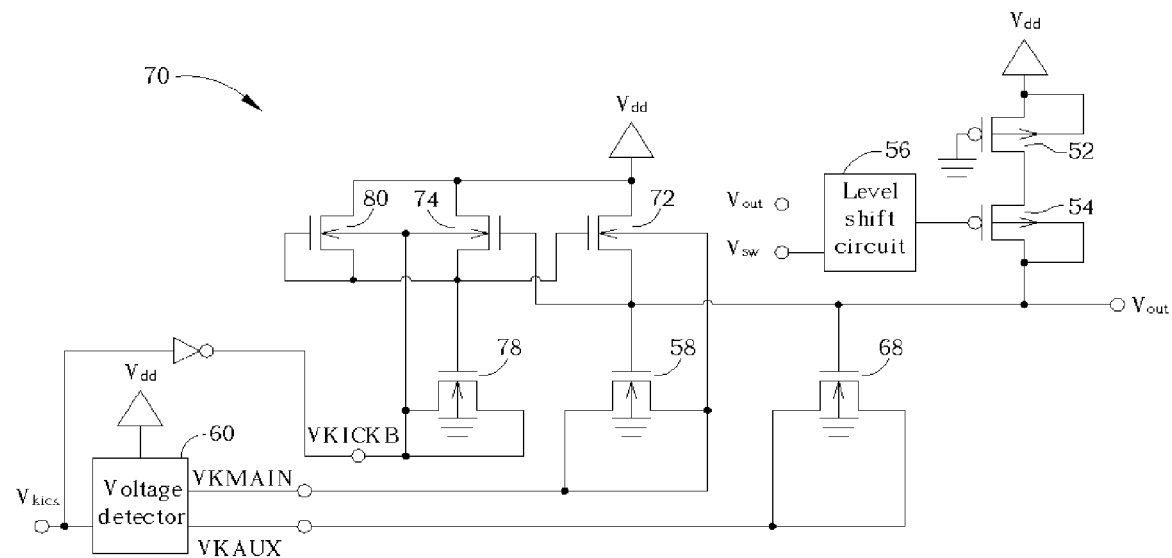
FIG. 5 is a circuit diagram of a boost circuit of a second embodiment according to the present invention.

Please refer to FIG. 5, which is a circuit diagram of a boost circuit 70 of a second embodiment according to the present invention. In addition to the first PMOS transistor 52, the second PMOS transistor 54, the level shift circuit 56, the main transistor 58, the auxiliary transistor 68, and the voltage detector 60, the boost circuit 70 further comprises a stable transistor 78, a main re-charge transistor 72 for re-charging the main transistor 58 according to a voltage level of the stable transistor 78, and a stable re-charge transistor 74 for re-charging the stable transistor 78 according to a voltage level of the main transistor 58.

Figure 6:
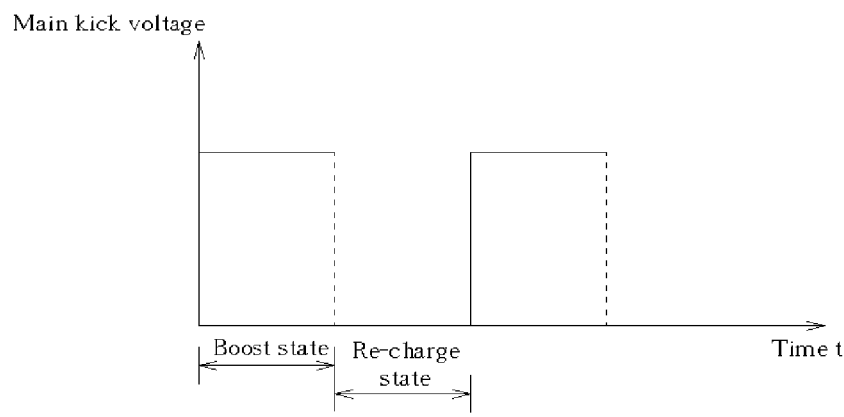
FIG. 6 is a waveform diagram showing a main kick voltage VKMAIN in the boost circuit shown in FIG. 5 according to the present invention.
Figure 7:
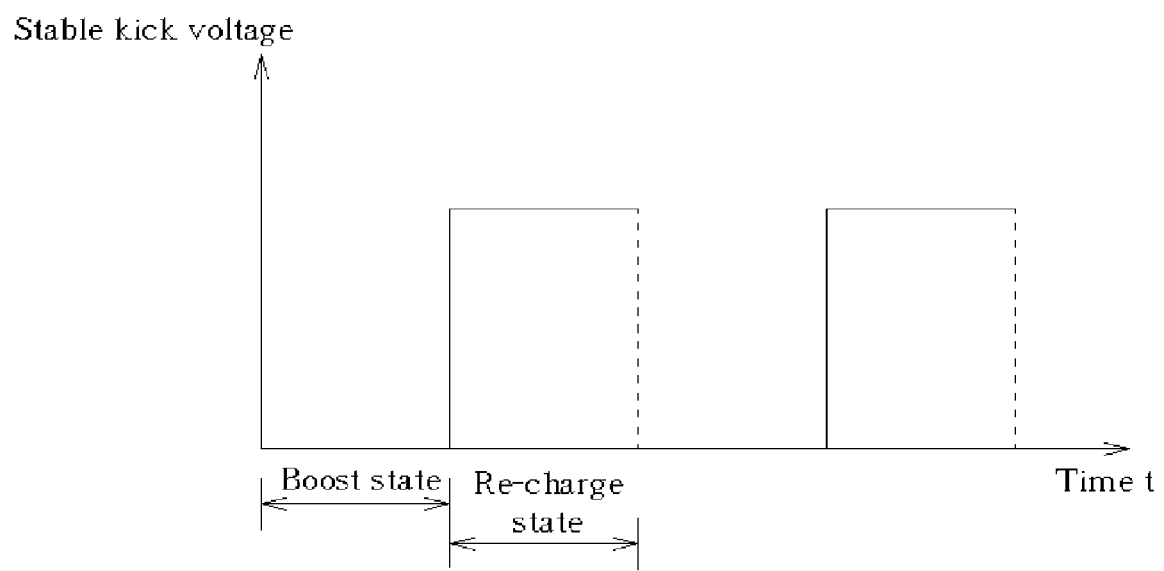
FIG. 7 is a waveform diagram showing a stable kick voltage VKICKB in the boost circuit shown in FIG. 5 according to the present invention.

Of the boost circuit 70, the main transistor 58 is controlled by a main kick voltage VKMAIN, and the stable transistor 78 is controlled by a stable kick voltage VKICKB, which is contrary to the main kick voltage VKMAIN. The main kick voltage VKMAIN is shown in FIG. 6, and the stable kick voltage VKICKB is shown in FIG. 7. In detail, when the main transistor 58 is boosting the output voltage $V_{out}$ (a boost state shown in FIG. 6), not only the output voltage $V_{out}$ is boosted, a voltage level on the main transistor 58 is also high enough to turn on the stable re-charge transistor 74, which has a capability to re-charge the stable transistor 78 and increase a voltage level on the stable transistor 78. Alternately, when the main transistor 58 is controlled by the main kick voltage VKMAIN to stop boosting the output voltage $V_{out}$ (a re-charge state shown in FIG. 6), the stable kick voltage VKICKB, along with the voltage level on the stable transistor 78, is high enough to turn on the main re-charge transistor 72, which has a capability to re-charge the main transistor 58.

Figure 8:
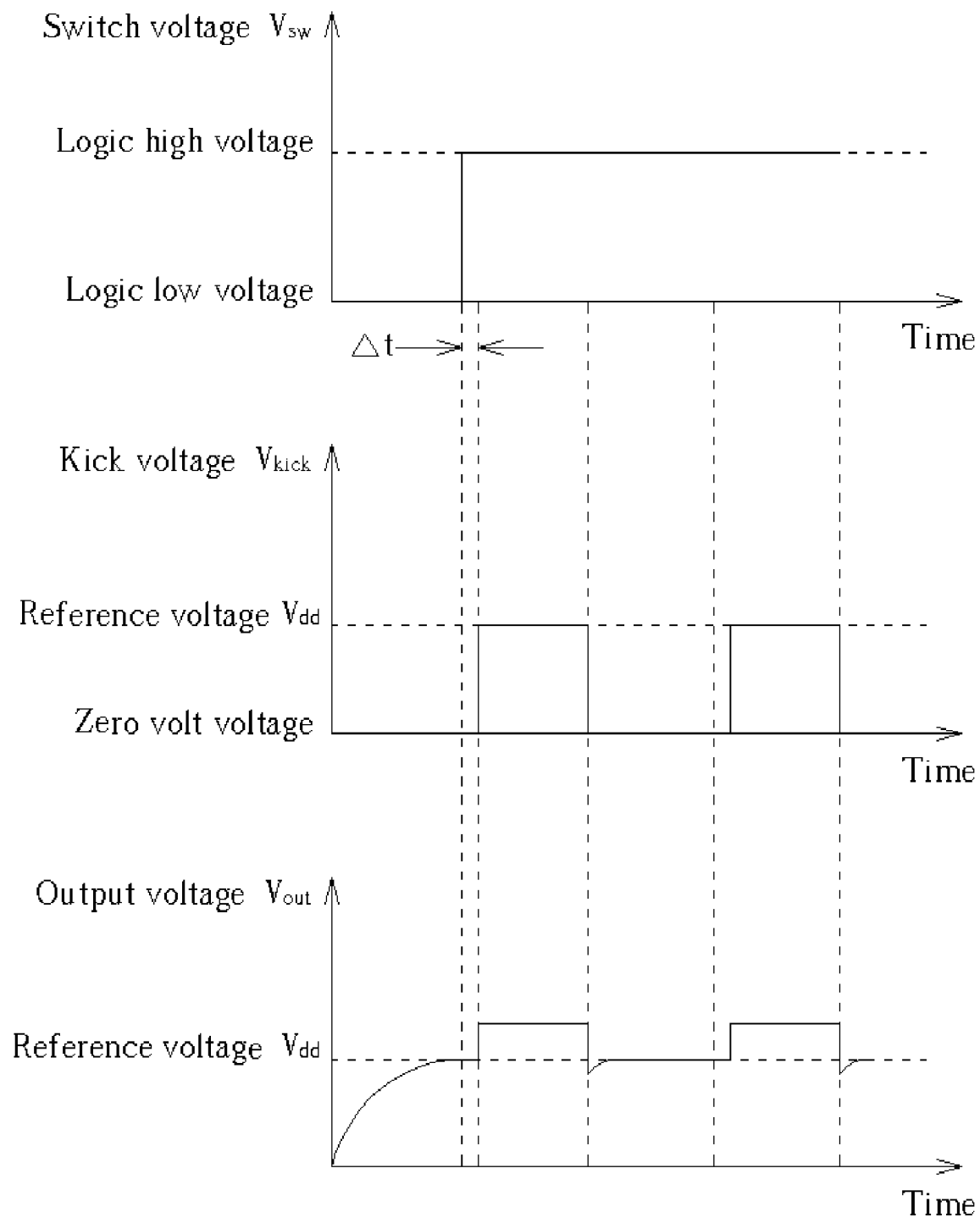
FIG. 8 is a waveform diagram showing a switch voltage $V_{sw}$, a kick voltage $V_{kick}$, and an output voltage $V_{out}$ in the boost circuit shown in FIG. 5 according to the present invention.

Of the second embodiment, since the main re-charge transistor 72, together with the stable transistor 78 and the stable re-charge transistor 74, has the capability to re-charge the main transistor 58, different from the level shift circuit 56(18) of the boost circuit 50(10), which is implemented to control the second PMOS transistor 54(16) and is controlled by the switch voltage $V_{sw}$ to turn on or turn off the second PMOS transistor 54(16) alternatively, the level shift circuit 56 of the boost circuit 70 turns on the second PMOS transistor 54 to pre-charge the main transistor 58 and the auxiliary transistor 68 as well during an initial period when the boost circuit 70 is not ready to output the output voltage $V_{out}$, as shown in FIG. 8, and turns off the second PMOS transistor 54 after the boost circuit 70 is outputting the output voltage $V_{out}$. Therefore, even occupying a small area and with a low charging efficiency, the first PMOS transistor 52, and the second PMOS transistor 54 as well, will not make any impact on the charging efficiency of the boost circuit 70.

The boost circuit 70 shown in FIG. 7 further comprises a transistor 80 electrically connected to the stable transistor 78 for removing residue charges on the stable transistor 78.

In contrast to the prior art, the present invention can provide a boost circuit including a first PMOS transistor, a second PMOS transistor, a main transistor, an auxiliary transistor, and a voltage detector, which is capable of detecting whether a reference voltage is higher than a predetermined voltage and disabling the auxiliary transistor when detecting that the reference voltage is higher than the predetermined voltage. Therefore, the boost circuit will not output too high an output voltage. According to the second embodiment, the boost circuit further includes a stable transistor, a main re-charge transistor, and a stable re-charge transistor for re-charging the main transistor when the boost circuit is boosting the reference voltage into the output voltage, so as to replace the first PMOS transistor and the second PMOS transistor as well. Therefore, even though the first PMOS transistor, and the second PMOS transistor as well, has only a small area, the first PMOS transistor and the second PMOS transistor will not make any impact on the charging efficiency of the boost circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A boost circuit capable of boosting a reference voltage into an output voltage, the boost circuit comprising:
    a main transistor electrically connected to the output voltage;
    an auxiliary transistor electrically connected to the output voltage;
    a pre-charge circuit electrically connected to the main transistor and the auxiliary transistor for pre-charging the main transistor and the auxiliary transistor, the pre-charge circuit comprising:
        a first PMOS transistor;
        a second PMOS transistor electrically connected between the first PMOS transistor and the main and the auxiliary transistor; and
        a level shift circuit electrically connected to the second PMOS transistor and the output voltage for transferring the output voltage to the second PMOS transistor according to a switch voltage; and
    a voltage detector electrically connected to the auxiliary transistor and the reference voltage for controlling the auxiliary transistor according to the reference voltage.

2. The boost circuit of claim 1, wherein the main transistor is a triple-welled NMOS.

3. The boost circuit of claim 1, wherein the auxiliary transistor is a triple-welled NMOS.

4. The boost circuit of claim 1, wherein the voltage detector disables the auxiliary transistor when detecting that the reference voltage is higher than a predetermined voltage.

5. The boost circuit of claim 1 further comprising a re-charge module electrically connected to the main transistor for re-charging the main transistor.

6. The boost circuit of claim 5, wherein the re-charge module comprises:
    a stable transistor;
    a main re-charge transistor electrically connected between the stable transistor and the main transistor for re-charging the main transistor according to a voltage level of the stable transistor; and
    a stable re-charge transistor electrically connected between the stable transistor and the main transistor for re-charging the stable transistor according to a voltage level of the main transistor.

7. A boost circuit capable of boosting a reference voltage into an output voltage, the boost circuit comprising:
    a main transistor electrically connected to the output voltage;
    a pre-charge circuit electrically connected to the main transistor for pre-charging the main transistor;
    a stable transistor;
    a main re-charge transistor electrically connected between the stable transistor and the main transistor for recharging the main transistor according to a voltage level of the stable transistor;
    a stable re-charge transistor electrically connected between the stable transistor and the main transistor for re-charging the stable transistor according to a voltage level of the main transistor;
    an auxiliary transistor electrically connected to the voltage; and
    a voltage detector eclectically connected to the reference voltage and the auxiliary transistor for controlling the auxiliary transistor according to the reference voltage.

8. The boost circuit of claim 7, wherein the voltage detector disables the auxiliary transistor when detecting the reference voltage is higher than a predetermined voltage.

9. A boost circuit capable of boosting a reference voltage into an output voltage, the boost circuit comprising:
    a main transistor electrically connected to the output voltage;
    a re-charge module electrically connected to the main transistor for re-charging the main transistor, the re-charge module comprising:
        a stable transistor;
        a main re-charge transistor electrically connected between the stable transistor and the main transistor for re-charging the main transistor according to a voltage level of the stable transistor; and
        a stable re-charge transistor electrically connected between the stable transistor and the main transistor for re-charging the stable transistor according to a voltage level of the main transistor;
    an auxiliary transistor electrically connected to the output voltage;
    a pre-charge circuit electrically connected to the main transistor and the auxiliary transistor for pre-charging the main transistor and the auxiliary transistor; and
    a voltage detector electrically connected to the auxiliary transistor and the reference voltage for controlling the auxiliary transistor according to the reference voltage.

10. The boost circuit of claim 9, wherein the main transistor is a triple-welled NMOS.

11. The boost circuit of claim 9, wherein the auxiliary transistor is a triple-welled NMOS.

12. The boost circuit of claim 9, wherein the voltage detector disables the auxiliary transistor when detecting that the reference voltage is higher than a predetermined voltage.

* * * * *